United States Patent
Martinez et al.

(10) Patent No.: US 12,554,753 B2
(45) Date of Patent: Feb. 17, 2026

(54) TECHNICAL DATA ENRICHMENT THROUGH LANGUAGE MODELS

(71) Applicant: MICROSOFT TECHNOLOGY LICENSING, LLC, Redmond, WA (US)

(72) Inventors: Andy Daniel Martinez, Pembroke Pines, FL (US); Pramod Kumar Sharma, Seattle, WA (US); Zhihui Guo, Redmond, WA (US); Liang Du, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 167 days.

(21) Appl. No.: 18/525,817

(22) Filed: Nov. 30, 2023

(65) Prior Publication Data

US 2025/0181614 A1    Jun. 5, 2025

(51) Int. Cl.
*G06F 40/279* (2020.01)
*G06F 16/3329* (2025.01)
(Continued)

(52) U.S. Cl.
CPC .......... *G06F 16/3329* (2019.01); *G06F 16/35* (2019.01); *G06F 40/284* (2020.01); *G06F 40/40* (2020.01)

(58) Field of Classification Search
CPC ........ G06F 16/35; G06F 40/40; G06F 40/279; G06F 40/284
See application file for complete search history.

(56) References Cited

U.S. PATENT DOCUMENTS

| 2022/0122692 A1* | 4/2022 | Feala | G06N 3/0455 |
| 2023/0054552 A1* | 2/2023 | Yang | G16B 15/20 |

(Continued)

FOREIGN PATENT DOCUMENTS

EP    4503043 A1 *    2/2025    ............. G06N 3/045

OTHER PUBLICATIONS

Guo et al, "Multilingual molecular representation learning via contrastive pre-training", Sep. 2021, arXiv preprint arXiv:2109.08830. Sep. 18, 2021, pp. 1-13 (Year: 2021).*

(Continued)

*Primary Examiner* — Olujimi A Adesanya
(74) *Attorney, Agent, or Firm* — Benjamin Keim; Newport IP, LLC (57) ABSTRACT

This disclosure provides a mechanism for the enrichment of sparse datasets using language models. By training language models on the specific distribution of known values in a dataset, missing values can be predicted, and the predicted values added, thereby resulting in a more complete dataset. This method also facilitates the enhancement and augmentation of datasets by predicting values for new properties that were not previously available. The approach proves particularly effective at scale, transforming large sparse datasets into more complete and enhanced datasets. Masking language modeling may be employed to train language models capable of generating representations of technical data. Training data includes corpuses of technical data that may be represented as text strings. These pretrained models are fine-tuned to predict various properties. The resulting models can predict missing values in large technical datasets, providing valuable data for guiding scientific research.

20 Claims, 5 Drawing Sheets

(51) Int. Cl.
    *G06F 16/35*     (2019.01)
    *G06F 40/284*     (2020.01)
    *G06F 40/40*     (2020.01)

(56) References Cited

U.S. PATENT DOCUMENTS

| | | | |
|---|---|---|---|
| 2023/0169281 A1* | 6/2023 | Zheng | G10L 15/28 704/2 |
| 2023/0307088 A1* | 9/2023 | Costello | G16B 40/20 |
| 2024/0194299 A1* | 6/2024 | Garcia | G16B 40/20 |
| 2024/0404632 A1* | 12/2024 | Ho | G16B 30/00 |
| 2025/0037807 A1* | 1/2025 | Ben-Joseph | G16C 20/70 |
| 2025/0189496 A1* | 6/2025 | Healey | H01J 49/004 |

OTHER PUBLICATIONS

Chithrananda et al., "ChemBERTa: large-scale self-supervised pretraining for molecular property prediction", Oct. 2020, arXiv preprint arXiv:2010.09885. Oct. 19, 2020, pp. 1-7 (Year: 2020).*

Memariani et al., "Automated and explainable ontology extension based on deep learning: A case study in the chemical domain", Sep. 2021, arXiv preprint arXiv:2109.09202. Sep. 19, 2021, pp. 1-16 (Year: 2021).*

Machado, "End-To-End Transformer-Based Approach for Optimized de Novo Drug Design", Sep. 2022, (Master's thesis, Universidade de Coimbra (Portugal)), pp. 1-125 (Year: 2022).*

Tran et al., "Molecular descriptors property prediction using transformer-based approach", Jul. 2023, International Journal of Molecular Sciences. Jul. 26, 2023;24(15):11948. (Year: 2023).*

* cited by examiner

TECHNICAL DATA ENRICHMENT THROUGH LANGUAGE MODELS

BACKGROUND

The field of scientific research, both in industry and academia, has seen an increase in the use of large datasets comprising rich technical information. These datasets are leveraged for a multitude of tasks, owing to the individual characteristics they encompass. The combination of these pieces of data can further aid in tasks like comparisons between different technical material and guiding research, thereby broadening the range of tasks that can benefit from these datasets.

However, the curation of such extensive and rich datasets poses significant challenges. It is a technically complex, time-consuming, and cost-prohibitive process that often requires subject matter experts to collect or annotate different information for each entry. Consequently, these datasets often turn out to be sparse, lacking key data elements that could be pivotal for research. This sparsity becomes a substantial hurdle for tasks that require a rich and complete dataset. For instance, comparing two potential therapeutics can be problematic if the same features are not available for both.

The conventional approach to dealing with sparse datasets involves collecting the missing pieces of information. However, generating or collecting this information often requires many more resources than are reasonably available, rendering manual data supplementation an unfeasible solution. An alternative approach is to discard records with missing data, but this comes at the cost of a significantly reduced dataset. Therefore, there is a need for an efficient method to handle the challenges posed by sparse datasets in the field of scientific research. This disclosure is made with respect to these and other considerations.

SUMMARY

One general aspect of this disclosure includes a method of data enrichment. The method also includes pretraining a transformer-based language model with a corpus of technical data. The method includes fine-tuning the language model for a property with labeled data. The method also includes enriching an existing dataset by adding values for the property that are not present in the existing dataset.

Implementations of the method may include one or more of the following features. The method where the pretraining may include masked language modeling (MLM). The technical data may include text strings that represent a physical structure using an ordered sequence of text characters. In some implementations, the corpus does not include properties of the technical data. The property can be a discrete variable and the fine-tuning then includes a classification-based training technique. The property can be a continuous variable and the fine-tuning then includes a regression loss function. The existing dataset may be enriched by adding missing values for a property that exists in the existing dataset. The existing dataset may be enriched by adding values in the existing dataset for a new property that is not in the existing dataset. The method may include training a tokenizer for the technical data.

This disclosure also includes a system for data enrichment. The system also includes a memory coupled to a processor. The system also includes a transformer-based language model pretrained on a corpus of technical data. The system also includes a fine-tuning module configured to fine-tune the transformer-based language model for a property. The system also includes an enrichment module configured to add values for the property to an existing dataset.

Implementations of the system may include one or more of the following features. The system where the transformer-based language model may include an embedding layer, multiple transformer layers, and a classification layer. The fine-tuning module uses a classification-based training technique configured to fine-tune the transformer-based language model when the property is a discrete variable. The fine-tuning module uses a regression loss function to fine-tune the transformer-based language model when the property is a continuous variable. The system may include a tokenizer configured to tokenize the technical data. The fine-tuning module is further configured to train the transformer-based language model on the property-specific dataset thereby creating a fine-tuned language model. In some implementations, the property is not present in the corpus of technical data used to pretrain the transformer-based language model.

A further aspect of this disclosure includes a user interface. The user interface includes an identifier of a technical object. The interface also includes a first value for a first property of the technical object, the first value obtained from an existing dataset. The interface also includes a second value for a second property of the technical object, the second property obtained from a transformer-based language model that is fine-tuned for the second property.

Implementations of the user interface may include one or more of the following features. The user interface where the second value is labeled as a value that was generated by a machine learning model. The user interface when the second value is labeled with an accuracy rate for the language model that is fine-tuned for the second property. In an implementation, the language model is pretrained using a text string that represents a physical structure of the technical object, the text string from the existing dataset from which the first property is obtained. In an implementation the second property is represented by a discrete variable and fine-tuning of the language model is performed using a classification-based training. In an implementation the second property is represented by a continuous variable and the fine-tuning of the language model is performed using a regression loss function.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

This disclosure provides a mechanism to enrich datasets containing technical data using language models. Machine learning models, of which language models are one type, can be trained to predict values for a property in the dataset. Capturing the distribution of known values makes it possible to understand the patterns, trends, relationships in existing data. When an existing dataset contains sparse data, the distribution of the known values can be learned and used to predict the missing values in order to generate a more complete dataset. Additionally, datasets can be augmented by using a pretrained model to predict values for new properties that were not previously present in that dataset. These techniques scale well making it possible to fill in gaps in a sparse dataset and enhance datasets by adding values for new properties. Scientists can use these enhanced datasets for research involving technical data and will be able to leverage the additional data generated by a language model.

The techniques of this disclosure can use masking language modeling to train language models capable of generating representations of technical objects. Language models are trained on large corpuses of text string representations of technical objects. The text string representations represent a physical structure using an ordered sequence of text characters. The pretrained models are then fine-tuned for the task of predicting values for specific properties. The resulting collection of multiple, property-specific models can be used on technical datasets to predict missing values and add values for properties that are not present. This facilitates tasks such as the comparison of two technical objects for which the same pieces of information have not been annotated by subject matter experts. This also allows for a more accurate and complete search of the appropriate technical object for a given research task, by enhancing the amount of information available for each entry in a large dataset.

Figure 1:
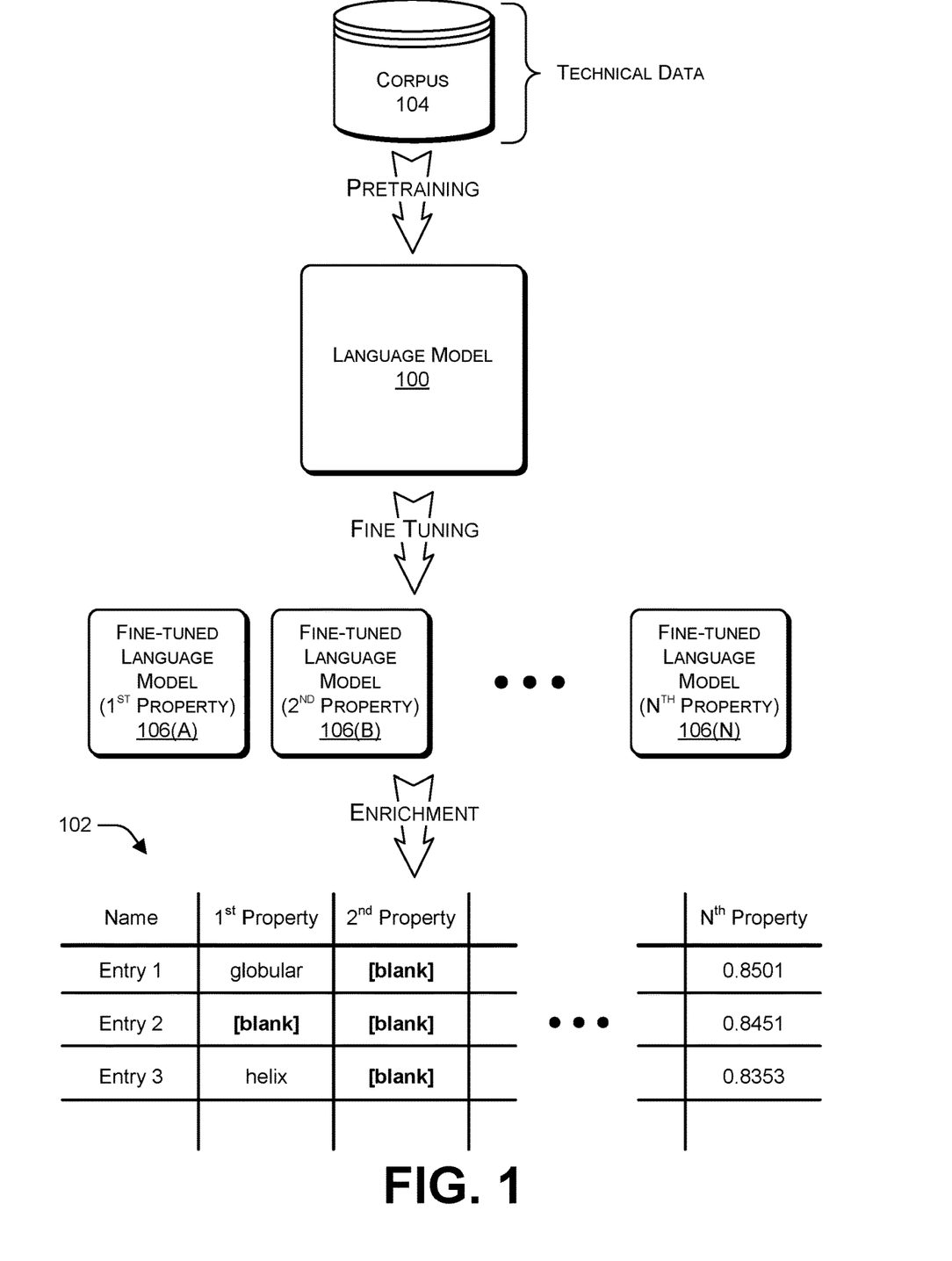
FIG. 1 is a diagram showing a technique for use of a language model to enrich a dataset of technical data.

FIG. 1 is a diagram showing how a language model 100 can be used to enrich an existing dataset 102. A corpus 104 is used to train the language model 100. The corpus 104 is generally a large database that contains technical data. Examples of technical data include biological sequence data and chemical data. Biological sequence data includes protein data and polynucleotide sequence (e.g., genomic) data. Chemical data includes molecule data, compound data, formulation data, and drug data. There are many existing databases of technical data currently used for scientific research such as UniProt, PubChem, and ChEMBL. Any of these existing databases, newly developed databases, or another database such as a proprietary database, may be used as a source of data for the corpus 104.

UniProt is the UNIversal PROtein resource, a central repository of protein data created by combining the Swiss-Prot, TrEMIBL and PIR-PSD databases. It is a freely accessible database of protein sequence and functional information with many entries being derived from genome sequencing projects. PubChem is a freely available database of chemical molecules and their activities against biological assays. It contains millions of compound structures and descriptive datasets. ChEMBL is a manually curated database of bioactive molecules with drug-like properties. It brings together chemical, bioactivity and genomic data to aid the translation of genomic information into effective new drugs.

The corpus 104 includes text string representations of technical objects. Examples of technical objects are proteins, polynucleotides, and molecules. A text string representation is a series of text characters that encodes or symbolizes the physical structure of a technical object both through the specific characters used and the order of the characters. Thus, text string representations have characteristics similar to that of natural language text even though a protein or a molecule are physical objects not linguistic representations. For proteins, the physical structure is the sequence of amino acids which may be presented as a series of single letter or three letter codes representing individual amino acids. For polynucleotides, the physical structure is the sequence of nucleotide bases represented as a string of letters (e.g., AGCT). For molecules, the physical structure is the identity of the atoms, their charges, and the bonds connecting them. There are multiple existing text string formats for representing molecules including simplified molecular-input line-entry system (SMILES) and International Chemical Identifier (InChI). Any of these or other text string representations for technical objects (e.g., proteins, polynucleotides, and molecules) may be used.

Although the original database from which the corpus 104 will likely include information such as one or more properties of a technical object, the corpus 104 itself may be limited to only the text string representations. Thus, the corpus 104 may be a collection of protein sequences or a large number of SMILES strings without any additional properties or features. The corpus 104, if it contains biological sequence data, may include sequences from multiple different species of organisms. For example, the corpus 104 may include sequences from more than 3, 4, 5, 10, 100, or some other number of different species of organisms. Included data from three or more different species in training data improved the generalizability of the language model 100.

The language model 100 is a machine learning model that includes one or more neural networks and is configured for learning semantic relationships in natural language text. A language model is a probabilistic model of a natural language that can generate probabilities of a series of words, based on text corpora it was trained on.

In implementations, the language model 100 may be a transformer-based language model. A transformer-based language model is a machine learning model based on the now ubiquitous transformer architecture described in Vaswani et al., "Attention is all you need." Advances in Neural Information Processing Systems 30 (NIPS 2017). In some implementations, the language model 100 uses a Bidirectional Encoder Representations from Transformers (BERT) which is a transformer-based language model architecture. It consists of multiple layers of self-attention and feed-forward neural networks. BERT utilizes a bidirectional approach to capture contextual information from preceding and following tokens in a string. The BERT architecture is described in Devlin et al., "BERT: Pretraining of Deep Bidirectional Transformers for Language Understanding." arXiv preprint arXiv:1810.04805 (2018). The language model 100 may alternatively use a variant of the BERT model referred to as Robustly Optimized BERT Pretraining Approach (RoBERTa). RoBERTa has the same architecture as BERT but uses byte pair encoding (BPE) as a tokenizer and uses a different pretraining scheme. RoBERTa is described in Liu, Yinhan, et al. "Roberta: A robustly optimized bert pretraining approach." arXiv preprint arXiv:1907.11692 (2019).

Current state of the art language models use feed-forward neural networks and transformers (e.g., BERT and RoBERTa) but language models can also be created with recurrent neural networks, word n-gram language models, or other techniques. The language model 100 of this disclosure is not limited to any specific model architecture and may be implemented with types of language models that are not yet developed. The language model 100 has a design and architecture that is capable of processing natural language inputs, but in this disclosure the language model 100 is used to model the relationships in technical data such as protein sequences or text string representations of molecules. Accordingly, instead of training the language model 100 on a corpus of natural language text, the corpus 104 contains biological sequence data or chemical data as described above.

During pretraining the input strings from the corpus 104 (e.g., protein sequences, SMILES strings, and the like) are used to train the language model 100. The pretraining may be performed with self-supervised learning in which the training data does not include labels. Thus, a large number of protein sequences, polynucleotide sequences, text string representations of molecules, or the like can be used by themselves to pretrain the language model 100. The pretraining creates weights in the language model 100 that represent the basic physical, chemical, and/or biological semantics contained in the technical data from the corpus 104.

The pretraining thus creates a general language model that represents an understanding of all the data contained in the corpus 104. Pretraining the language model 100 is computationally expensive especially when using a large corpus 104. Generally, the pretraining is only performed once resulting in a general language model that can be further modified or fine-tuned. The language model 100 is specific to the "language" or type of data used for the pretraining. Thus, pretraining with protein sequences creates a different language model 100 than training with SMILES strings. There will also be different language models 100 for each type of text string representation of molecules, for example, a model trained on SMILES strings will be different than a model trained on InChI strings.

Once the language model 100 has been pretrained, it is fine-tuned to create a fine-tuned language model 106 that is specific to a particular property of a protein or molecule. The fine-tuning uses a labeled dataset that has values for the property for multiple different technical objects such as proteins or molecules. The property can be any property relevant to a technical object on which the language model 100 was pretrained. The property could be any property in an existing database such as UniProt, PubChem, or ChEMBL. Examples of properties for proteins include but are not limited to shape, stability, fluorescence, remote homology, etc. Examples of properties for molecules include molecular weight, clinical trial toxicity, drug log solubility, hydration free energy, blood brain barrier penetration, etc. The property can be represented by a continuous numerical value (e.g., molecular weight) or by a discrete label (e.g., protein shape).

The labeled dataset used for the fine tuning may be the same data that is used to generate the corpus 104. For example, if a large database of protein data is used for the corpus 104, that data including labeled values for the property can be used for the fine tuning. It is also possible to use only a portion of the data from the database that provided the corpus 104. However, the labeled dataset may also be a separate property-specific dataset. For example, there could be a set of data for a specific molecular property that is used for the fine-tuning. The labeled dataset used for the fine-tuning may include all, some, or none of the same proteins or molecules included in the corpus 104. That is, the data used to perform the fine-tuning does not need to have any overlap (although it may) with the data used to create the corpus 104. Typically, the size of the labeled dataset used for fine-tuning is much smaller than the size of the corpus 104.

The fine-tuning adjusts weights of the language model 100 to improve accuracy for predictions specific to a single property. Fine-tuning is much less computationally intensive than the pretraining of the language model 100. In some implementations, many layers of the language model 100 are frozen and only one or a few layers are modified during the fine-tuning. This greatly reduces the computational costs compared to relearning weights for all the layers of the language model 100.

Because the fine-tuning modifies the language model 100 by improving its ability to make predictions for particular property, there may be a separate fine-tuned language model 106 for each property of interest. Thus, there may be a first fine-tuned language model 106(A) for a first property, a second fine-tuned language model 106(B) for a second property, up to an $N^{th}$ fine-tuned language model 106(N) for an $N^{th}$ property. There may be any number of fine-tuned language models 106. Each fine-tuned language model 106 is associated with its own accuracy rate. The fine-tuning may be performed by the same or different entity that performs the pretraining the language model 100. For example, a first entity could create the language model 100 and then separate users could perform customized fine-tuning to create fine-tuned language models 106 specific to properties of interest to those users. Additional fine-tuned language models 106 may be created as needed as new and different properties become relevant.

One or more of the fine-tuned language models 106 are used to enrich an existing dataset 102. The existing dataset 102 is illustrated as a table but it may take any form. The existing dataset 102 may also be maintained only as a data structure and does not need to have any particular representation in a user interface (UI). In an implementation, the existing dataset 102 is part or all of a database that was used to create the corpus 104 for pretraining the language model 100. Thus, the existing dataset 102 could be UniProt, PubChem, ChEMBL, or a similar database. However, the existing dataset 102 may also be entirely distinct from the data used to create the corpus 104.

The existing dataset 102 contains multiple entries for technical objects. These entries may be proteins, polynucleotides, or molecules. Each entry may be identified by an identifier or name such as a common name. Each entry is also associated with one or more properties. For example, if the entries are proteins one property could be protein shape such as secondary or tertiary structure.

If the existing dataset 102 is a sparse dataset, there will be some properties for which there are not values for every entry. The lack of values is shown in FIG. 1 by blank entries in some cells of the table. One application for the language model 100 is to fill in these blanks or missing entries in a sparse dataset. The values are predicted by a fine-tuned language model 106 trained for that specific property. Because there are values from some entries in the existing dataset 102 for this property, the existing dataset 102 itself can provide the labeled dataset for the fine-tuning. It may be desirable to use the existing dataset 102 for training because the distribution of values for that property are likely to be similar for all the entries in the dataset, thus those entries that have values provide a good basis for predicting a value for those entries without. The fine-tuned language model 106 learns the distribution from the available data and uses that to fill in the missing entries. The existing dataset 102 is then enriched by adding predicted values for the property to those entries that were initially blank. This creates a more complete dataset.

Another possible use for the language model 100 is to augment an existing dataset 102 by adding values for a property that was not originally in the dataset. This could be a property that may be available in some datasets but was not included by the creators of the existing dataset 102. It could also be a property that was not previously of interest such as binding affinity to a newly discovered cell surface receptor. Augmentation of the existing dataset 102 with a new property can be thought of as adding a new column to the table. This is illustrated in FIG. 1 by the $2^{nd}$ Property for which all entries are blank. Training a fine-tuned language model 106 for this type of property requires a labeled dataset other than the existing dataset 102. This can be a property-specific dataset. The property-specific dataset includes technical objects (e.g., proteins or molecules) labeled with values for that property. The technical objects are the same type of technical objects used for pretraining the language model 100 (e.g., both protein sequences) but there may be entirely different technical objects in both datasets. That is, the proteins included in the property-specific dataset may not be included in the corpus 104 used for the pretraining. However, two distinct datasets may have different data distributions resulting in lower predictive accuracy than two datasets in which many of the technical objects are the same.

Both of these two forms of data enrichment—filling in sparse data and adding values for a new feature—improve the existing dataset 102 by adding predicted values for one or more properties where there were blanks previously. The values predicted by machine learning will likely be less accurate than those determined through standard experimental techniques. However, having predicted values rather than blanks makes the existing dataset 102 more useful.

For example, by having a complete dataset without blanks it is possible to compare any two entries in the dataset based on any or all of the properties. If the existing dataset 102 contains molecules that could be used as drugs, the ability to make more comparisons can improve drug discovery. A potential drug that was not identified before because the database did not have any values for relevant properties can now be identified based on the predicted values for those properties.

The language model 100 can also be used to combine multiple existing datasets by including properties and entries from the existing datasets. The ability to fill in sparse data and add new "columns" of data make it possible to concatenate information from multiple sources. Thus, the existing dataset 102 may be a combination of multiple databases that may have some or no overlap between the entries (e.g., the proteins or molecules) and some or no overlap between the properties for each entry. When combined, the resulting dataset will be a robust and complete dataset with values for each property for every entry.

Figure 2:
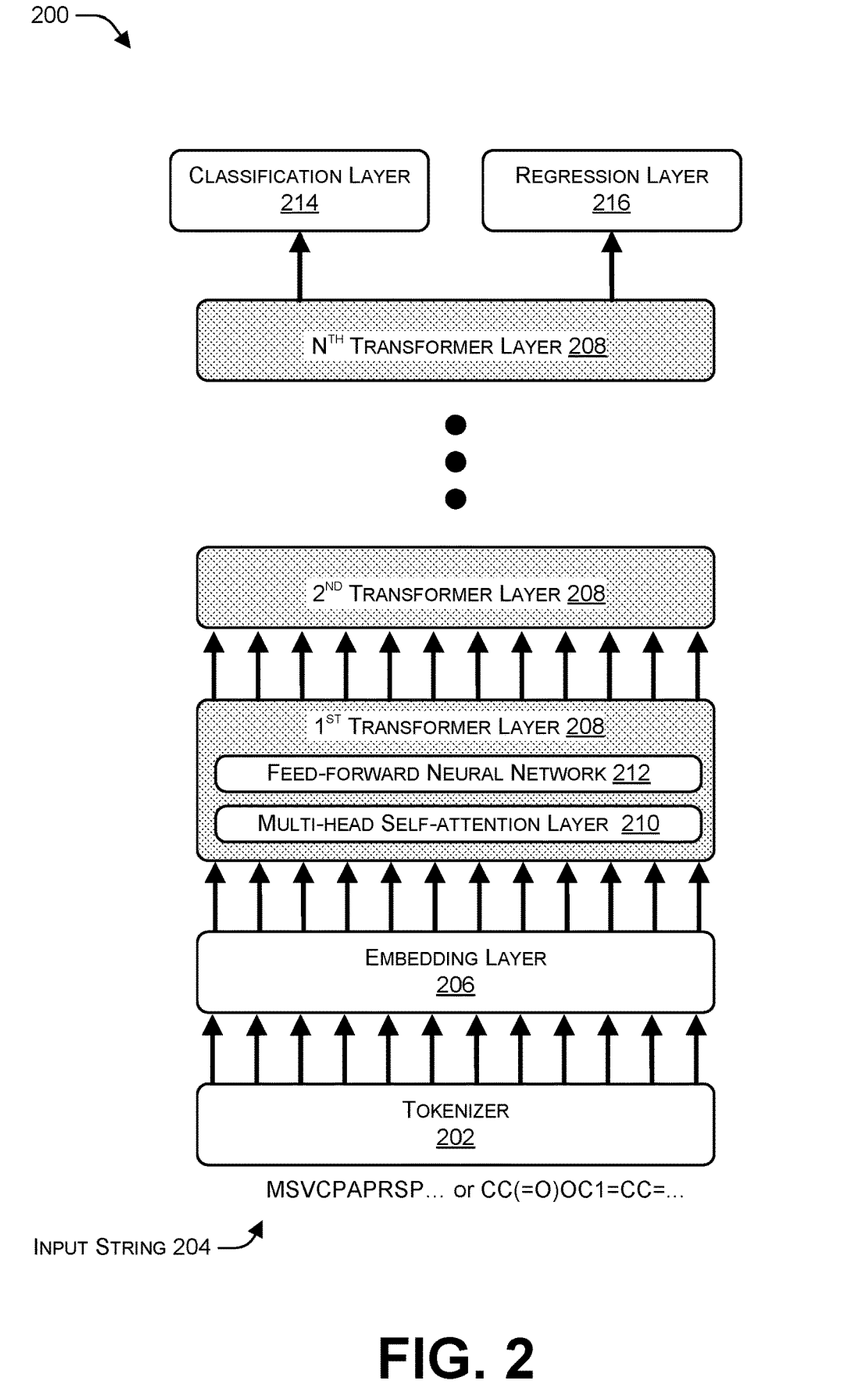
FIG. 2 is a diagram of an illustrative architecture of a language model.

FIG. 2 shows an illustrative architecture 200 of the language model 100 introduced in FIG. 1. The architecture 200 is based on the architecture of BERT and RoBERTa, however, the language model 100 is not limited to these architectures and may be implemented with an alternative architecture.

The architecture 200 includes a tokenizer 202. The tokenizer is a preprocessing tool that breaks down an input string 204 into smaller units called tokens. Tokenization makes it easier for a model to process input data. The input string 204 is a text string representing a technical object. For example, the input string 204 may be a protein sequence, a SMILES string, or another text string representations of a technical object. In pretraining, the input string 204 is one of the entries in the corpus 104. These tokens can be portions of the input string 204 and as small as individual characters. The choice of tokens depends on the tokenizer. There are many types of known tokenizers and techniques for tokenization. Any of these, or other techniques, can be adapted for processing protein sequences or text string representations of molecules rather than natural language.

In one implementation the tokenizer is subword tokenizer such as a BPE tokenizer. BPE is a subword tokenization method that is used for natural language processing. BPE operates by iteratively replacing the most frequent pair of bytes in a dataset with a single, unused byte. This process continues until a predefined number of merge operations have been performed or until no more merges are possible. The result is a set of byte pairs that represent the most common sequences in the data.

In the context of language models, BPE has been adapted to tokenize strings into subunits, which can capture the morphological nuances of input strings better than fixed length tokenization. BPE starts with a base vocabulary of individual characters and iteratively merges the most frequent pair of tokens to form new, longer tokens. This process continues until a predefined vocabulary size is reached. The advantage of BPE is that it can handle any input string, no matter how rare, by breaking it down into known units.

BPE can be used to tokenize protein sequences or text string representations of molecules in a similar way to how it is used in natural language processing. For protein sequences, the process begins with a fixed vocabulary of individual amino acids. Each amino acid in a protein sequence can be initially treated as a token. BPE then progressively merges the most frequent pairs of tokens (amino acids in this case) based on their occurrence frequency in the training sequences. This iterative process continues until a predefined vocabulary size is reached. Use of BPE rather than simply treating each amino acid as a token allows the language model to capture more complex patterns in the protein sequences beyond individual amino acids.

The choice of tokenizer may be specific to the type of input string 204. For example, the type of tokenizer used to process protein sequences may be different than that used to process SMILES strings. The number of tokens created by the tokenizer 202 is a hyperparameter that may be varied and could depend on the length of the input string 204. For example, the number of tokens could be 128, 256, 512, or another number.

Tokens from the tokenizer 202 are passed to an embedding layer 206. The embedding layer coverts the integer-encoded sequences from the tokenizer 202 into dense, continuous-valued vectors that can be processed by other layers of the architecture 200. The embedding layer 206 may create two types of embeddings: token embeddings and position embeddings. Token embeddings are the embeddings for the individual tokens in the input string. Positional embeddings are used to understand the order of tokens in the input string 204. This can be important because the same tokens may have different meanings depending on their order in the input string. The token embedding and the position embedding may be added together to form a single vector. The length of the vectors generated by the embedding layer 206 is a hyperparameter that may be varied. For example, the vectors may have 768, 1024 or a different number of dimensions.

The vectors generated by the embedding layer 206 are passed to a series of multiple transformer layers 208. There may be any number of transformer layers 208 stacked on top of each other. The number of transformer layers 208 is an additional hyperparameter. For example, the architecture 200 could include 12, 24, or a different number of transformer layers 208. The multiple transformer layers 208 are responsible for understanding the context of the input tokens and generating contextualized representations of them. The transformer layers 208 serve to understand the context of the input string 204 by allowing attention to be paid to different parts of the input independently, thereby capturing the dependencies between all elements in the input.

Each transformer layer 208 consists of two sub-layers which are a multi-head self-attention layer 210 and a feed-forward neural network 212. The multi-head self-attention layer 210 helps the language model 100 to understand the context of a token in relation to all other tokens in the input string 204. It does this by assigning attention scores to all tokens in the input string 204 for a given word, indicating how much each token should contribute to the final representation of the given input string 204. The feed-forward neural network 212 is a simple neural network that is applied to each position separately and identically. It consists of two linear transformations with an activation function in between. Many different activation functions could be used such as Rectified Linear Unit (ReLU), Gaussian Error Linear Unit (GELU), and SwiGLU which is a variation of GLU (Gated Linear Unit) that replaces the sigmoid activation function with Swish.

The stack of transformer layers 208 generates an output that is then passed to either a classification layer 214 or a regression layer 216. The classification layer 214 is used to predict the value of a continuous variable that takes one of several discreate values. The regression layer 216 is used to predict the value for a continuous variable. The value is the prediction for a specific feature for a protein or molecule.

The classification layer 214 takes a sequence of hidden states, produced by the transformer layers 208, and applies a transformation to generate a set of logits, each corresponding to a target class. The architecture of the classification layer can vary depending on the task. Some predictions might be generated using a simple linear layer, while others might require more complex architectures. For instance, a multi-class classification problem could be addressed by passing the logits through a dense layer with a softmax activation function, which generates probabilities for each class. The class with the highest probability is typically selected as the prediction.

The regression layer 216 also takes a sequence of hidden states, produced by the transformer layers 208 and maps these states to a continuous output. The regression layer often uses an activation function suitable for the range of the target variable. For example, if the target variable is positive, a ReLU activation function may be used. The ReLU function outputs the input directly if it is positive; otherwise, it outputs zero. For example, some implementations might use a simple linear layer for univariate prediction tasks, while others might use a more complex setup for multivariate prediction tasks. In some cases, additional techniques such as dropout or batch normalization may be incorporated into the regression layer to improve model performance.

In some implementations, only the weights of the classification layer 214 or the regression layer 216 are modified during the fine-tuning process. However, additional layers of the architecture 200 may also be unfrozen and modified during fine-tuning. Therefore, the classification layer 214 or the regression layer 216 can be considered a component of a fine-tuned language model 106. Each fine-tuned language model 106 will have a unique classification layer 214 or regression layer 216 because each fine-tuned language model 106 is trained on different data.

Figure 3:
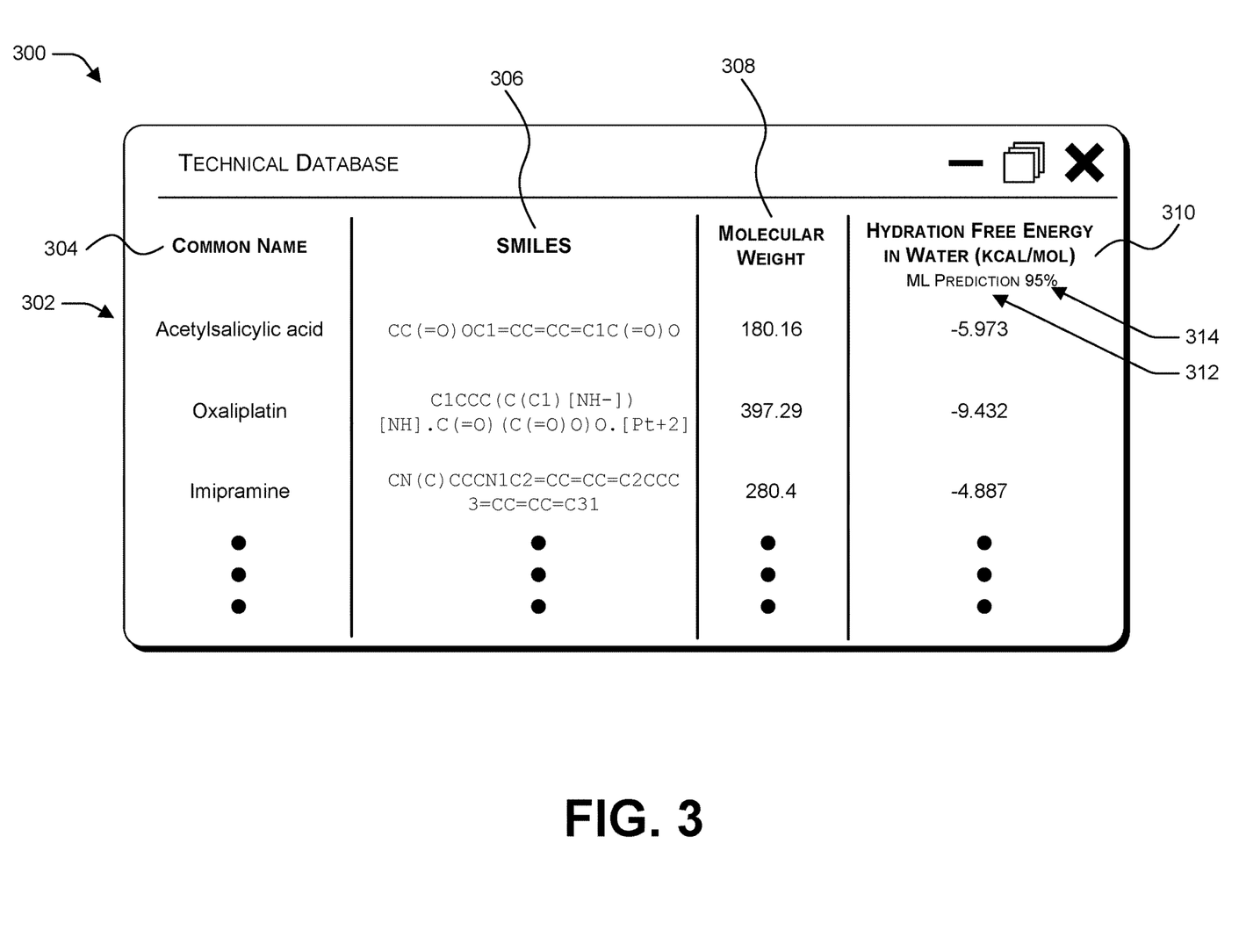
FIG. 3 is a diagram of an illustrative user interface showing a dataset supplemented with entries generated by a language model.

FIG. 3 shows an illustrative user interface (UI) 300 of a technical database. The technical database may contain multiple entries 302 and each entry 302 may contain information about a single technical object such as a protein or molecule. In this illustrative UI 300, a first entry is for the molecule acetylsalicylic acid, a second entry is for the molecule oxaliplatin, and a third entry is for the molecule imipramine. Each entry 302 includes one or more fields which may be presented in the UI 300 as columns. The UI 300 may include a first column that contains an identifier 304 of a technical object. The identifier 304 of the technical object is an identifier that is readily understandable by a human user such as a common name. The UI 300 may also include a second column containing a text string 306 used to represent the technical object. However, this is not necessarily displayed to the user in every implementation. For molecules, this may be a SMILES string, an InChI string, or another type of text string used to represent a chemical structure. For proteins, the text string 306 is a protein sequence that may use single letter or three letter representations of amino acids. This may be the same type of text string was used to train the language model 100.

The UI 300 may also include one or more columns that provide additional information about the technical object such as properties of a protein or molecule. A third column may include values for a first property 308 (e.g., molecular weight) of the technical objects. The values of the first property 308 may be obtained from an existing dataset 102. The existing dataset 102 may be a database used to generate the corpus 104 for training the language model 100. Although these properties were not used for pretraining the language model 100, they may be obtained from the same existing dataset 102 that supplied the text strings used for the pretraining. Thus, the UI 300 can include values for properties that are not generated by machine learning. In some instances, every value for a given property (i.e., an entire column) may be obtained from an existing dataset 102. However, the technical database displayed in the UI 300 may also include values generated by machine learning to fill in sparse data (e.g., values for blank entries in a column) as well as to add values for a new feature that was not originally available in the dataset (e.g., add a new column).

A fourth column shown in the UI 300 contains values for a second property 310 (e.g., hydration free energy in water)

that are predicted by the machine learning techniques of this disclosure. Specifically, values for the second property 310 may be obtained from a language model 100, such as a transformer-based model, that is fine-tuned for the second property 310. Thus, in this example, values for the column with the heading "hydration free energy in water" are generated by a fine-tuned language model 106 specifically trained on this property. The technical database may include any number of properties values that are shown in the UI 300 in any number of columns.

The properties displayed in the UI 300, such as the first property 308 and the second property 310, may be represented by discrete variables or by continuous variables. In this illustrative UI 300, both molecular weight and hydration free energy in water are continuous variables. As mentioned above, the specific technique for fine-tuning the language model will depend on the type of variable represented by the property. For discrete variables, fine-tuning can be performed using classification-based training. For continuous variables, fine-tuning can be performed using a regression loss function.

In some implementations, entries that are generated by machine learning model are marked with a label 312 that denotes the entry as a predicted value. For example, the label 312 may be denoted by text, a symbol, bold font, highlighting, or any other type of UI element that can distinguish entries generated by machine learning from other entries. The label 312 provides transparency by enabling a user to easily identify which entries in the technical database were generated by machine learning.

Entries like the those of the second property 310 that are generated by machine learning may be labeled with an accuracy rate label 314. The accuracy rate label 314 shows an accuracy rate for the specific fine-tuned language model 106 that generated the predicted value. The accuracy rate may be determined by comparing predictions of the fine-tuned language model 106 with ground truth values if they exist. Ground truth values come from the existing dataset 102 if the fine-tuned language model 106 is used to fill in gaps in sparse data. When a property is added for which there are no (or only a few) entries in the existing dataset 102, a separate property-specific dataset with labels is used for training. Accuracy is calculated based on this dataset. The accuracy rate label 314 in the UI 300 provides a user a way to understand how much to trust or rely upon values generated by machine learning. In some implementations, the label 312 denoting a machine learning prediction and the accuracy rate label 314 may be combined into a single label or UI element (e.g., a superscript number showing the accuracy rate that is present only for those values predicted by machine learning).

Figure 4:
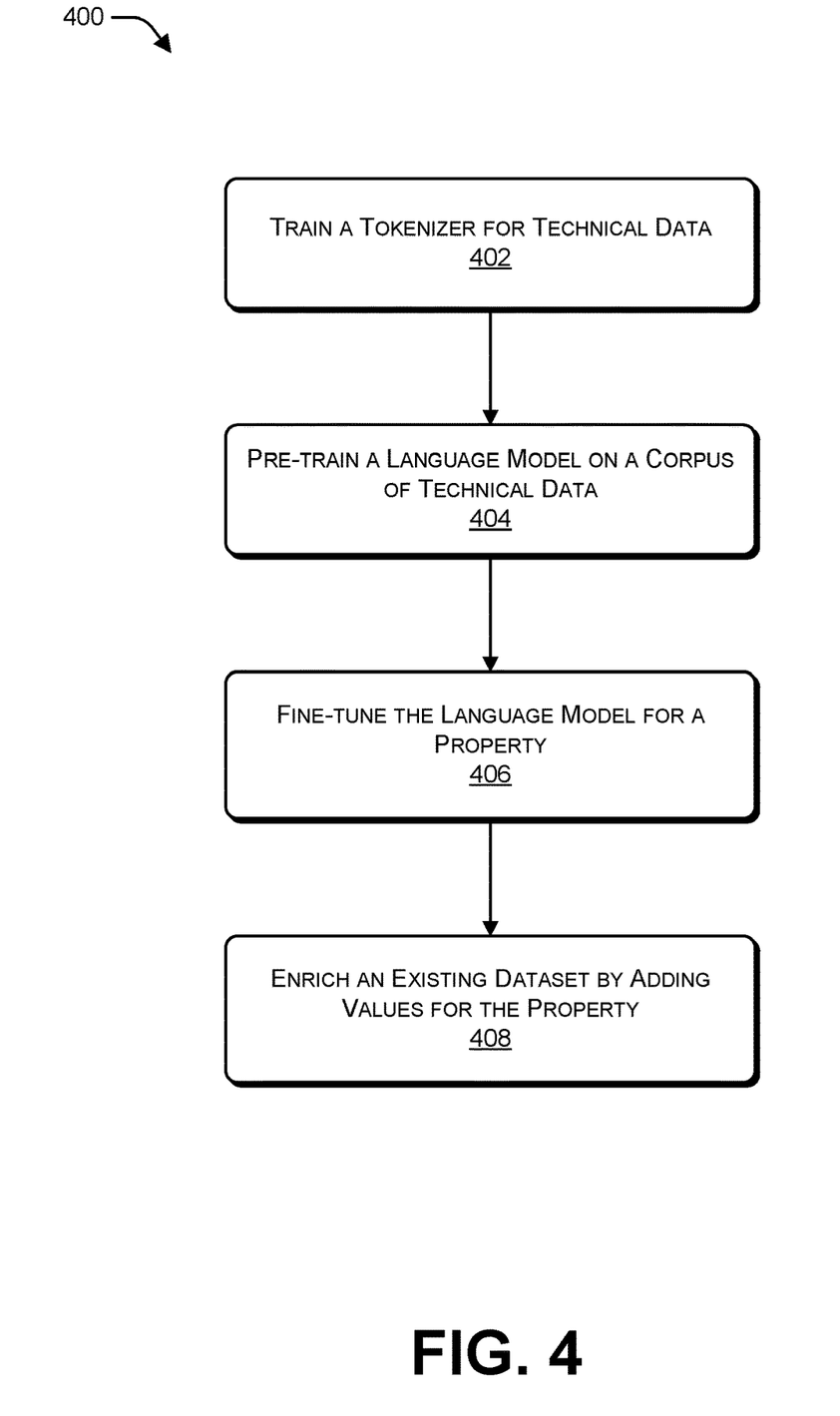
FIG. 4 is a flowchart of a method for enriching a dataset by adding values for a property generated by a language model.

FIG. 4 is a flow diagram of an illustrative method 400 for using a language model to enrich a dataset of protein data or molecule data. Method 400 may be implemented using the architecture shown in FIG. 2 and the computing system shown in FIG. 5.

At operation 402, a tokenizer is trained for the technical data. The tokenizer may be any type of tokenizer configured to generate tokens from technical data such as protein data or molecule data. In some implementations, the tokenizer is a subword tokenizer such as a BPE tokenizer. The tokenizer may be trained on a smaller set of data than the set of data used for training the language model. The training process involves learning the statistical properties of the input strings and using this information to decide how to best split the strings into tokens.

At operation 404, a language model is pretrained on a corpus of technical data. In some implementations, the language model is a transformer-based language model. The language model may have an architecture that is similar to or adapted from existing language models such as BERT or RoBERTa. The technical data may be text strings that represent a physical structure using an ordered sequence of text characters. For example, the technical data may represent the physical structure of proteins, polynucleotides, or molecules using amino acid sequences, nucleic acid sequences, SMILE strings, InchI strings, and the like. In some implementations, the corpus of technical data does not include properties of the technical data. Thus, the corpus of technical data may include only text strings that represent physical structures without any associated properties or features.

The specific pretraining technique may be selected based on the type of language model and the technical data. Many possible techniques for pretraining a language model from a corpus of data are known to those of ordinary skill in the art. In some implementations, the pretraining is performed by a self-supervised learning technique. With self-supervised learning, the language model learns relationships in the training data without relying on external labels. Thus, relationships among the entries in the corpus of training data are used to train the learning model. Through pretraining, the language model can learn the semantics of the "language" of the technical objects such as proteins or molecules. Without being bound by theory, it is believed that this pretraining gives the language model an understanding of the general physics, biochemistry, and/or chemistry of the proteins or molecules. Examples of self-supervised learning that have been used with language models include, but are not limited to, masked language modeling (MLM) and replaced token detection.

MLM involves intentionally obscuring, or "masking," certain portions of the input data, and then training the model to predict these masked portions based on the surrounding context. This can be thought of as a sophisticated "fill-in-the-blank" task. In a typical MLM scenario, a portion of the input data is selected and replaced with a mask token. The model is then tasked with predicting the original content of the masked portion, using only the unmasked parts of the input for context. This forces the model to learn a deeper understanding of the data, as it must infer the missing information based on the surrounding context.

For example, when training a model on protein sequences, an individual amino acid in the sequence might be masked. The model is then trained to predict the identity of this masked amino acid based on the context provided by the rest of the sequence and other sequences in the training corpus. This approach can help the model to learn the patterns and relationships inherent in protein sequences. This same technique can be applied to a wide range of data types. For example, SMILES strings can be used as input data for MLM. By masking and predicting parts of these SMILES strings, a model can learn to understand the underlying rules and patterns of chemical structures.

Replaced token detection is another self-supervised learning technique that shares similarities with MLM but is generally more computationally efficient. Instead of masking the input, this technique corrupts the input by replacing some tokens with plausible alternatives sampled from a small generator network. Then, instead of training a model that predicts the original identities of the corrupted tokens, replaced token detection trains a discriminative model that predicts whether each token in the corrupted input was replaced by a generator sample or not. One technique for replaced token detection is described in Clark, Kevin, et al. "Electra: Pretraining text encoders as discriminators rather than generators." arXiv preprint arXiv:2003.10555 (2020).

At operation 406, the language model is fine-tuned for a specific property of the technical objects. The specific property will be some property possessed by the technical objects that is selected by a user or designer of the system. An example of a property for proteins is protein stability. An example of a property for a molecule is log solubility. The property may be represented by a discrete variable (e.g., one of a defined number of categories) or a continuous variable (e.g., a continuously variable measurement).

If the property is represented by a discrete variable, the fine-tuning may be performed using a classification-based training technique such as categorical cross-entropy. Categorical cross-entropy is a loss function that is used in multi-class classification tasks. These are tasks where an example can belong to one of many possible categories, and the goal of the model is to predict which one. In the context of machine learning, categorical cross-entropy quantifies the difference between two probability distributions: the true distribution (the one-hot encoded vector of true labels) and the predicted distribution (the output probabilities for each class from the model).

If the property is represented by a continuous variable, the fine-tuning may be performed using a regression loss function. There are many types of regression loss functions which may be used including, but not limited to, mean square error (MSE), quadratic loss, mean absolute error (MAE), Huber loss, and log-cosh loss. MSE provides a performance benchmark due to its link to the concept of cross-entropy from information theory. MSE corresponds to the square root of the average difference between the observed known outcome values and the predicted values. The lower the MSE, the better the prediction of the model.

During the fine-tuning process, the model's parameters are adjusted to minimize the regression loss function such as MSE. This is because for normally distributed (Gaussian) data, minimizing the MSE is equivalent to minimizing the cross-entropy. In probabilistic terms, minimizing the MSE is equivalent to maximizing the likelihood of the data. In some implementations, the MSE is normalized by dividing it by the variance of the data. Normalization removes the effect of scale, allowing for comparison among models with multiple variables. Other possible manipulations include using a log link, where the MSE becomes the mean squared logarithmic error (MSLE), which measures the relative difference between the true and predicted values.

The fine-tuning may be used to modify only a portion of the model architecture pretrained at operation 408. In some implementations, the fine-tuning may only modify a classification layer or regression layer applied to the output of the language model. In other implementations, one or more layers of the language model are unfrozen and weights within those layers of the language model are modified by fine-tuning. Any number of layers of language model can be unfrozen and modified during the fine-tuning. Unfrozen layers of the language model may also be jointly trained together with a newly added classification layer or newly added regression layer. In yet other implementations, every layer of the language model is unfrozen and subject to modification during the fine-tuning.

The number of layers of the language model that are unfrozen during fine-tuning may be based on the size of the dataset used for the fine-tuning. If the set of labeled data used for the fine-tuning is relatively small, retraining many layers of language model could lead to overfitting. Thus, when fine-tuning is performed with a relatively small set of data only one or a few layers of the language model will be unfrozen. As the size of the dataset user fine-tuning grows, the number of layers of the language model that can be unfrozen with minimal risk of overfitting also grows.

Fine-tuning creates a fine-tuned language model from the general language model pretrained at operation 402. Each fine-tuned language model is trained to predict values for one particular property. Thus, the labeled property-specific dataset used for the fine-tuning will be different for each fine-tuned language model. Moreover, the specific training techniques used for fine-tuning may be different for each property, and thus, different for each fine-tuned language model.

At operation 408, an existing dataset is enriched by adding values for the property. Enriching a dataset may include adding missing values for a property that exists in the dataset. Thus, if there are values of a property for some but not all entries in the dataset, this is a sparse dataset that can be enriched through filling in the "missing" values. Enriching a dataset may also include adding values for a new property that is not in the dataset. The values for the new property may be predicted based on a property-specific dataset that is used for the fine-tuning. This technique makes it possible to add entirely new categories of information to a dataset based on an understanding of the underlying semantics of the physical objects as captured by the language model.

Figure 5:
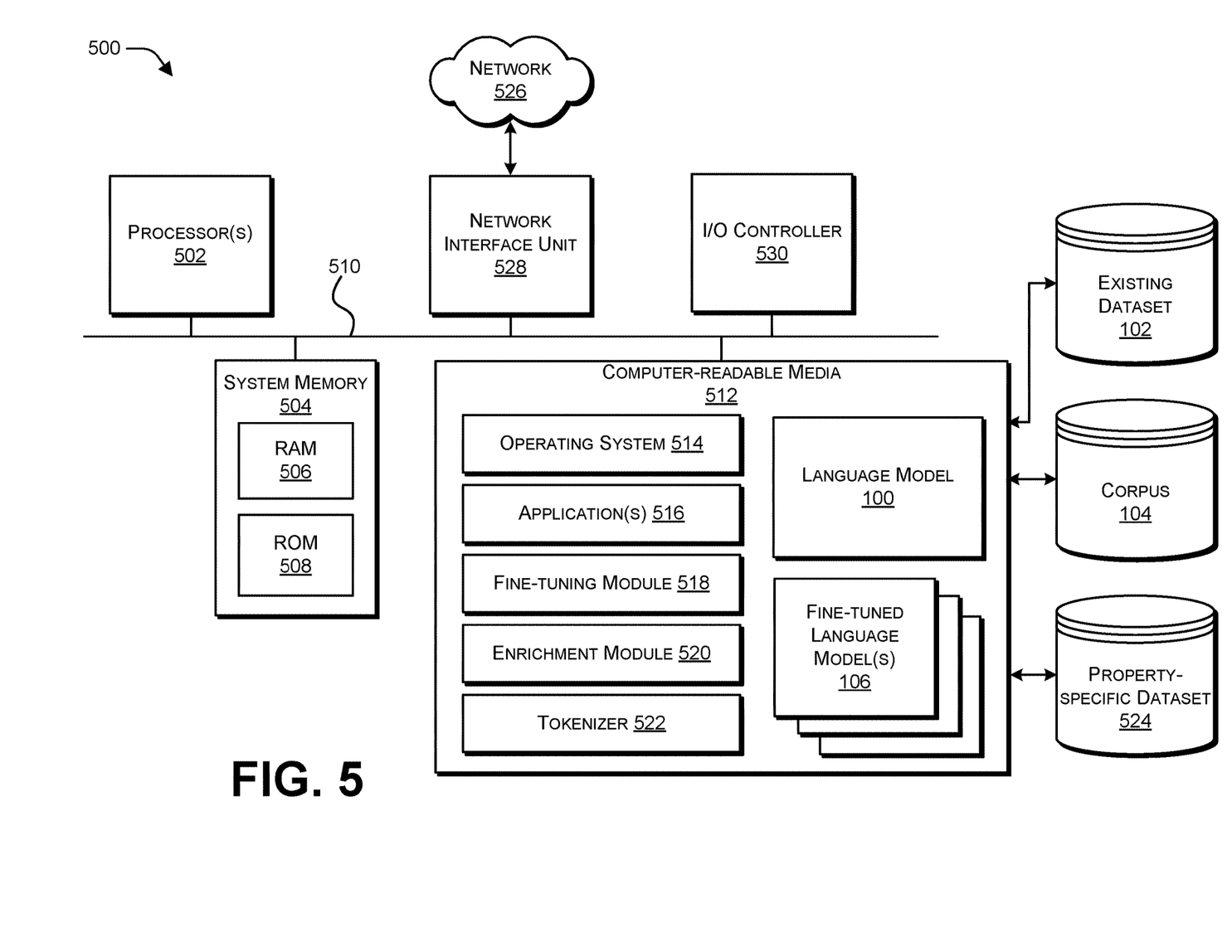
FIG. 5 is a computer architecture diagram illustrating an illustrative computer hardware and software architecture for a computing device capable of implementing aspects of the techniques and technologies presented herein.

FIG. 5 shows details of an example computing system 500 for a device, such as a computer or a server configured as part of a cloud-based platform, capable of executing computer instructions (e.g., a module or a component described herein). The computer architecture 500 illustrated in FIG. 5 includes one or more processor(s) 502, a system memory 504, including a random-access memory 506 ("RAM") and a read-only memory ("ROM") 508, and a system bus 510 that couples the memory 504 to the processors(s) 502. The processor(s) 502 may also comprise or be part of a processing system. In various examples, the processor(s) 502 of the processing system are distributed. Stated another way, one processor(s) 502 of the processing system may be located in a first location (e.g., a rack within a datacenter) while another processor(s) 502 of the processing system is located in a second location separate from the first location.

Processing unit(s), such as processor(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 500, such as during startup, is stored in ROM 508. The computer architecture 500 further includes a computer-readable media 512 for storing an operating system 514, application(s) 516, modules/components, and other data described herein. The operating system 514, application(s) 516, and modules/components may comprise computer-executable instructions implemented by the processor(s) 502. Examples of module/components include a fine-tuning module 518, an enrichment module 520, and a tokenizer 522. The computer-readable media 512 may also include the language model 100 and fine-tuned language model(s) 106 introduced in FIG. 1.

The fine-tuning module 518 is configured to fine-tune the language model 100 for a specific property. Fine-tuning may be performed as described at operation 406 in FIG. 4. Fine-tuning is performed using a labeled dataset in which the labels can be used to train the language model 100 to predict values for a property. The labeled dataset used by the fine-tuning module and 518 may be the same data that is used to generate the corpus 104.

In some implementations, the labeled dataset is a separate property-specific dataset 524. This property-specific dataset 524 is different than the corpus 104 and may contain data for a property that is not present in the corpus 104 of technical data used to pretrain the language model 100. There may be a separate property-specific dataset 524 for each property on which the language model 100 is fine-tuned. Thus, for each fine-tuned language model 106 that is not trained on the same dataset used to generate the corpus 104, there may be a separate property-specific dataset 524 used for the training.

In one implementation, the fine-tuning module 518 uses a classification-based training technique configured to fine-tune the language model 100 when the property is a discrete variable. In one implementation, the fine-tuning module 518 uses a regression loss function to fine-tune the language model 100 when the property is a continuous variable.

The enrichment module 520 is configured to add values for the property to an existing dataset 102. Enrichment may include one or both of adding missing values to a sparse data set as well as adding values for a new property that was not previously included in the existing dataset 102. Enrichment by the enrichment module 520 may be performed as described in operation 408 of FIG. 4. After enrichment, the existing dataset 102 includes additional data generated by one or more fine-tuned language models 106. This additional data is in addition to data representing values for properties that were already included in the existing dataset 102.

The tokenizer 522 is configured to tokenize the technical data by generating tokens from an input string. The tokenizer 522 may be any type of tokenizer suitable for tokenizing inputs to a language model. The tokenizer 522 may be the same as the tokenizer 202 shown in FIG. 2. The tokenizer 522 may be trained using the techniques described in operation 402 of FIG. 4. In an implementation the tokenizer is a subword tokenizer such as a BPE tokenizer.

The computer-readable media 512 is communicatively connected to processor(s) 502 through a mass storage controller connected to the bus 510. The computer-readable media 512 provides non-volatile storage for the computer architecture 500. Although the description of computer-readable media 512 contained may be implemented as a mass storage device, it should be appreciated by those skilled in the art that computer-readable media 512 can be any available computer-readable storage medium or communications medium that can be accessed by the computer architecture 500. The computer-readable media 512 is a type of memory. Anything shown as stored in the computer-readable media 512 may alternatively be stored on another computing device such as one accessible via the network 526.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static random-access memory (SRAM), dynamic random-access memory (DRAM), phase-change memory (PCM), ROM, erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network-attached storage, storage area networks, hosted computer storage or any other storage memory, storage device, and/or storage medium that can be used to store and maintain information for access by a computing device.

In contrast to computer-readable storage media, communication media embodies computer-readable instructions, data structures, program modules, or other data in a modulated data signal, such as a carrier wave, or other transmission mechanism. As defined herein, computer-readable storage medium does not include communication medium. That is, computer-readable storage media does not include communications media and thus excludes media consisting solely of a modulated data signal, a carrier wave, or a propagated signal, per se.

According to various configurations, the computer architecture 500 may operate in a networked environment using logical connections to remote computers through a network 526. The computer architecture 500 may connect to the network 526 through a network interface unit 528 connected to the bus 510. An I/O controller 530 may also be connected to the bus 510 to control communication in input and output devices.

It should be appreciated that the software components described herein may, when loaded into the processor(s) 502 and executed, transform the processor(s) 502 and the overall computer architecture 500 from a general-purpose computing system into a special-purpose computing system customized to facilitate the functionality presented herein. The processor(s) 502 may be constructed from any number of transistors or other discrete circuit elements, which may individually or collectively assume any number of states. More specifically, the processor(s) 502 may operate as a finite-state machine, in response to executable instructions contained within the software modules disclosed herein. These computer-executable instructions may transform the processor(s) 502 by specifying how the processor(s) 502 transitions between states, thereby transforming the transistors or other discrete hardware elements constituting the processor(s) 502.

Illustrative Embodiments

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method of data enrichment comprising: pretraining a transformer-based language model with a corpus of technical data (e.g., protein data or molecule); fine-tuning the language model for a property with labeled data; and enriching an existing dataset by adding values for the property that are not present in the existing dataset.

Clause 2. The method of clause 1, wherein the pretraining comprises masked language modeling (MLM).

Clause 3. The method of clause 1 or 2, wherein the technical data comprises text strings that represent a physical structure using an ordered sequence of text characters (e.g., amino acid sequences, SMILES, and InChI).

Clause 4. The method of any of clauses 1-3, wherein the corpus does not include properties of the technical data.

Clause 5. The method of any of clauses 1-4, wherein the property is a discrete variable and the fine-tuning comprises using a classification-based training technique.

Clause 6. The method of any of clauses 1-4, wherein the property is a continuous variable and the fine-tuning comprises using a regression loss function.

Clause 7. The method of any of clauses 1-6, wherein the enriching the existing dataset comprises adding missing values for a property that exists in the existing dataset.

Clause 8. The method of any of clauses 1-7, wherein the enriching the existing dataset comprises adding values in the existing dataset for a new property that is not in the existing dataset.

Clause 9. The method of any of clauses 1-9, further comprising training a tokenizer for the technical data.

Clause 10. A system comprising: a processor (502); a memory (512) coupled to the processor; a transformer-based language model (100) pretrained on a corpus (104) of technical data (e.g., protein data or molecule data); a fine-tuning module (518) configured to fine-tune the transformer-based language model for a property; and an enrichment module (520) configured to add values for the property to an existing dataset.

Clause 11. The system of clause 10, wherein the transformer-based language model comprises an embedding layer, multiple transformer layers, and a classification layer (e.g., a Bert framework).

Clause 12. The system of clause 10 or 11, wherein the fine-tuning module uses a classification-based training technique configured to fine-tune the transformer-based language model when the property is a discrete variable.

Clause 13. The system of clause 10 or 11, wherein the fine-tuning module uses a regression loss function to fine-tune the transformer-based language model when the property is a continuous variable.

Clause 14. The system of any of clauses 10-13, further comprising a tokenizer configured to tokenize the technical data.

Clause 15. The system of any of clauses 10-14, further comprising a property-specific dataset and wherein the fine-tuning module is further configured to train the transformer-based language model on the property-specific dataset thereby creating a fine-tuned language model, the property not present in the corpus of technical data used to pretrain the transformer-based language model.

Clause 16. A user interface comprising: an identifier (304) of a technical object (e.g., a molecule or protein); a first value for a first property (308) of the technical object, the first value obtained from an existing dataset (102); and a second value for a second property (310) of the technical object, the second property obtained from a transformer-based language model (100) that is fine-tuned for the second property.

Clause 17. The user interface of clause 16, wherein the second value is labeled as a value that was generated by a machine learning model.

Clause 18. The user interface of clause 17, when the second value is labeled with an accuracy rate for the language model that is fine-tuned for the second property.

Clause 19. The user interface of any of clauses 16-18, wherein the language model is pretrained using a text string that represents a physical structure of the technical object, the text string from the existing dataset from which the first property is obtained.

Clause 20. The user interface of any of clauses 16-19, wherein: (i) the second property is represented by a discrete variable and fine-tuning of the language model is performed using a classification-based training; or (ii) the second property is represented by a continuous variable and the fine-tuning of the language model is performed using a regression loss function.

CONCLUSION

While certain example embodiments have been described, including the best mode known to the inventors for carrying out the invention, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. Skilled artisans will know how to employ such variations as appropriate, and the embodiments disclosed herein may be practiced otherwise than specifically described. The accompanying claims and their equivalents are intended to cover such forms or modifications as would fall within the scope and spirit of certain of the inventions disclosed herein.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different sensors).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Furthermore, references have been made to publications, patents and/or patent applications throughout this specification. Each of the cited references is individually incorporated herein by reference for its particular cited teachings as well as for all that it discloses.

The invention claimed is:

1. A method of data enrichment comprising:
pretraining a transformer-based language model with a corpus of unlabeled technical data comprising biological sequence data or chemical data;
fine-tuning the transformer-based language model for a first property with a first property-specific dataset resulting in a first fine-tuned model having a first accuracy rate wherein fine-tuning the transformer-based language model for the first property comprises modifying only a portion of the transformer-based language model;
fine-tuning the transformer-based language model for a second property with a second property-specific dataset resulting in a second fine-tuned model having a second accuracy rate;
enriching an existing dataset by adding a first value for the first property generated by the first fine-tuned model and a second value for the second property generated by the second fine-tuned model, wherein the first value and the second value are not present in the existing dataset; and
generating a data structure for a user interface comprising data from the existing data set, the first value for the first property labeled with the first accuracy rate, and the second value for the second property labeled with the second accuracy rate.

2. The method of claim 1, wherein the pretraining comprises masked language modeling (MLM).

3. The method of claim 1, wherein the technical data comprises text strings that represent a physical structure using an ordered sequence of text characters.

4. The method of claim 1, wherein at least one of the first property or the second property is a discrete variable and the fine-tuning comprises using a classification-based training technique.

5. The method of claim 1, wherein at least one of the first property the second property is a continuous variable and the fine-tuning comprises using a regression loss function.

6. The method of claim 1, wherein the enriching the existing dataset by adding the first value comprises adding missing values for the first property that exists in the existing dataset.

7. The method of claim 1, wherein the enriching the existing dataset by adding the second value comprises adding values for the second property, the second property is a new property that was not previously in the existing dataset, thereby creating a combined dataset combining the existing dataset and the second property-specific dataset.

8. The method of claim 1, further comprising training a tokenizer for the technical data.

9. The method of claim 1, wherein the portion of the transformer-based language model is a number of layers of the transformer-based language model that are unfrozen.

10. The method of claim 1, wherein the portion of the transformer-based language model is a classification layer or a regression layer.

11. A system comprising:
a processor;
a memory coupled to the processor;
a transformer-based language model pretrained on a corpus of unlabeled technical data comprising biological sequence data or chemical data;
a fine-tuning module configured to:
fine-tune the transformer-based language model for a first property with a first property-specific dataset resulting in a first fine-tuned model having a first accuracy rate, wherein the fine-tuning module is configured to fine-tune the transformer-based model for the first property by modifying only a portion of the transformer-based language model, and
fine-tune the transformer-based language model for a second property with a second property-specific dataset resulting in a second fine-tuned model having a second accuracy rate;
an enrichment module configured to add a first value for the first property generated by the first fine-tuned model and a second value for the second property generated by the second fine-tuned model to an existing dataset, wherein the first value and the second value are not present in the existing dataset; and
an output system configured to generate a data structure for a user interface comprising data from the existing data set, the first value for the first property labeled with the first accuracy rate, and the second value for the second property labeled with the second accuracy rate.

12. The system of claim 11, wherein the transformer-based language model comprises an embedding layer, multiple transformer layers, and a classification layer.

13. The system of claim 11, wherein the property is a discrete variable and the fine-tuning module uses a classification-based training technique configured to fine-tune the transformer-based language model.

14. The system of claim 11, wherein the property is a continuous variable and the fine-tuning module uses a regression loss function to fine-tune the transformer-based language model.

15. The system of claim 11, further comprising a tokenizer configured to tokenize the technical data.

16. The system of claim 11, wherein the portion of the transformer-based language model is a number of layers of the transformer-based language model that are unfrozen.

17. The system of claim 11, wherein the portion of the transformer-based language model is a classification layer or a regression layer.

18. A computing device comprising:
an output device configured to display a user interface comprising:
an identifier of a technical object that is a protein, a polynucleotide, or a molecule;
an existing value for a first known property of the technical object, the existing value obtained from an existing dataset;
a first value for a first property of the technical object, the first value obtained from a first fine-tuned model created by fine-tuning a transformer-based language model with a first property-specific dataset for the first property, wherein fine-tuning the transformer-based model for the first property comprises modifying only a portion of the transformer-based language model, the first value labeled with a first accuracy rate indicating an accuracy of the first fine-tuned model; and a second value for a second property of the technical object, the second value obtained from a second fine-tuned model created by fine-tuning the transformer-based language model with the second property-specific data set for the second property, the second value labeled with a second accuracy rate value indicating an accuracy of the second fine-tuned model.

19. The computing device of claim 18, wherein the transformer-based language model is pretrained using a text string that represent a physical structure of the technical object, the text string from the existing dataset from which the known property is obtained.

20. The computing device of claim 18, wherein:
(i) the first property is represented by a discrete variable and fine-tuning of the transformer-based language model is performed using a classification-based training; or
(ii) the first property is represented by a continuous variable and the fine-tuning of the transformer-based language model is performed using a regression loss function.

* * * * *